(12) United States Patent
Dawson et al.

(10) Patent No.: US 8,055,630 B2
(45) Date of Patent: Nov. 8, 2011

(54) ESTIMATING RECOVERY TIMES FOR DATA ASSETS

(75) Inventors: Colin S. Dawson, Tucson, AZ (US);
Gregory J. Tevis, Tucson, AZ (US);
David G. Van Hise, Tucson, AZ (US)

(73) Assignee: International Business Machines Corporation, Armonk, NY (US)

( * ) Notice: Subject to any disclaimer, the term of this patent is extended or adjusted under 35 U.S.C. 154(b) by 410 days.

(21) Appl. No.: 12/140,354

(22) Filed: Jun. 17, 2008

(65) Prior Publication Data

US 2009/0313626 A1    Dec. 17, 2009

(51) Int. Cl.
*G06F 7/00* (2006.01)
*G06F 17/00* (2006.01)

(52) U.S. Cl. ......... 707/674; 707/675; 707/678; 707/679

(58) Field of Classification Search ........... 707/999.002, 707/999.202, 999.204, 674, 675, 678, 679, 707/686

See application file for complete search history.

(56) References Cited

U.S. PATENT DOCUMENTS

| 5,960,200 | A | 9/1999 | Eager et al. |
|---|---|---|---|
| 6,044,444 | A | 3/2000 | Ofek |
| 6,947,956 | B2 * | 9/2005 | Olstad et al. ............... 707/999.2 |
| 7,062,621 | B2 * | 6/2006 | Mizuno et al. ......... 707/999.202 |
| 7,107,292 | B1 * | 9/2006 | Hrle et al. .............. 707/999.202 |
| 7,158,917 | B1 | 1/2007 | Bickford |
| 7,536,291 | B1 * | 5/2009 | Vijayan Retnamma et al. ............................. 709/231 |
| 2004/0093408 | A1 | 5/2004 | Hirani et al. |
| 2004/0243699 | A1 | 12/2004 | Koclanes et al. |
| 2004/0249655 | A1 | 12/2004 | Doeberl et al. |
| 2005/0015641 | A1 | 1/2005 | Alur et al. |
| 2005/0066239 | A1 | 3/2005 | Keeton et al. |
| 2005/0251573 | A1 | 11/2005 | Merkow et al. |
| 2006/0015542 | A1 | 1/2006 | Pommerenk et al. |
| 2006/0059262 | A1 | 3/2006 | Adkinson et al. |
| 2006/0074993 | A1 | 4/2006 | Pulamarasetti et al. |
| 2006/0230317 | A1 * | 10/2006 | Anderson ....................... 714/38 |
| 2006/0253745 | A1 | 11/2006 | Maso et al. |
| 2007/0078861 | A1 | 4/2007 | Aidun |
| 2007/0088589 | A1 | 4/2007 | Ciprino et al. |
| 2007/0112883 | A1 * | 5/2007 | Asano et al. .................. 707/202 |
| 2007/0233828 | A1 | 10/2007 | Gilbert |
| 2007/0260908 | A1 * | 11/2007 | Mitchell et al. ................... 714/2 |
| 2008/0010076 | A1 | 1/2008 | McMahon et al. |

OTHER PUBLICATIONS

USPTO U.S. Appl. No. 11/939,004, Image File Wrapper printed on Apr. 16, 2010, 1 page.

Luo et al., "The Automatic Scheduling Algorithm Based on the Correlated Analysis for Share-Oriented CNC Tasks", Proceedings of the Sixth International Conference on Machine Learning and Cybernetics, Hong Kong, IEEE, Aug. 19-22, 2007, pp. 3148-3152.

(Continued)

*Primary Examiner* — Vincent Boccio (74) *Attorney, Agent, or Firm* — Francis Lammes; Stephen J. Walder, Jr.; Feb R. Cabrasawan (57) ABSTRACT

Estimating a recovery time for a data asset is provided. A request is received to project a recovery time for a data asset that uses a repository. A determination is made as to whether there are one or more existing recovery times for other data assets and other repositories that have characteristics similar to the data asset and the repository of the request. The recovery time for the data asset is projected using the one or more existing recovery times in response to an existence of the one or more existing recovery times.

18 Claims, 5 Drawing Sheets

OTHER PUBLICATIONS

Knodel et al., "Asset Recovery and Their Incorporation into Product Lines", Proceedings of the 12th Working Conference on Reverse Engineering (WCRE'05), IEEE, IEEE, 2005, pp. 10 pages.

Keeton et al., "Lessons and challenges in automating data dependability", ACM Digital Library, 2005, pp. 1-6.

Bernardi et al., "A UML Profile for Dependability Analysis of Real-Time Embedded Systems", ACM Digital Library, WOSP'07, Argentina, Feb. 5-8, 2007, pp. 226-235.

Nguyen et al., "Sense & Response Service Architecture (SARESA): . . . ", ACM Digital Library, DOLAP05, Bremen Germany, Nov. 4-5, 2005, pp. 77-86.

Lewis et al., "An Empirical Assessment of the Information Resouce Management Construct", Journal of Management Information Systems/Summer 1995, vol. 12, No. 1, pp. 199-223.

Goel et al., "The Taser Intrusion Recovery System", ACM Digital Library, SOSP'05, Brighton, United Kingdom, Oct. 23-26, 2005, pp. 274-287.

* cited by examiner

ESTIMATING RECOVERY TIMES FOR DATA ASSETS

BACKGROUND OF THE INVENTION

1. Field of the Invention

The present application relates generally to an improved data processing apparatus and method and more specifically to an apparatus and method for estimating the recovery time for data assets.

2. Background of the Invention

Within many enterprises, data assets may be comprised of different types of data depending upon how the data assets are used and the importance of the data assets to the enterprises. Some examples of data assets are applications, databases, servers, files, file systems, and the like. Similarly, there are many tools for managing these data assets and the data on these data assets. For instance, one known enterprise data protection product provides many different data protection techniques to protect data assets within an enterprise, corporation, remote office, or the like. Some of these data protection techniques are: progressive incremental backup, image backup, snapshot (orchestration and management), and continuous data protection. However, other known data protection management solutions do not provide a mechanism to plan for and orchestrate recovery operations based upon recovery objectives for an organization. Another data asset management tool is a storage resource management (SRM) product. The SRM product helps to monitor and manage storage resources within an enterprise including capacity planning and reporting, provisioning, replication management, and such.

However, the combination of data protection products and data asset management tools do not offer a holistic or integrated view with the focus on:

1. Protecting enterprise data assets; and
2. Ensuring that recovery operations for enterprise data assets meet a required recovery time objective (RTO) or recovery point objective (RPO).

That is, known data protection and storage resource monitoring systems are missing an integrated approach that offers analysis and assessment of "recovery readiness" for data assets. This existing deficit within the storage protection and management tools significantly increases the complexity of protecting and managing data. More importantly, known data protection and storage resource monitoring systems leave the determination about the readiness and efficacy of recovery to a manual process if readiness and efficacy of recovery are being considered at all.

BRIEF SUMMARY OF THE INVENTION

In one illustrative embodiment, a method, in a data processing system, is provided for estimating a recovery time for a data asset. The illustrative embodiments receive a request to project a recovery time for a data asset that uses a repository. The illustrative embodiments determine if there are one or more existing recovery times for other data assets and other repositories that have characteristics similar to the data asset and the repository of the request. Responsive to an existence of the one or more existing recovery times, the illustrative embodiments project the recovery time for the data asset using the one or more existing recovery times.

In other illustrative embodiments, a computer program product comprising a computer useable or readable medium having a computer readable program is provided. The computer readable program, when executed on a computing device, causes the computing device to perform various ones, and combinations of, the operations outlined above with regard to the method illustrative embodiment.

In yet another illustrative embodiment, a system/apparatus is provided. The system/apparatus may comprise one or more processors and a memory coupled to the one or more processors. The memory may comprise instructions which, when executed by the one or more processors, cause the one or more processors to perform various ones, and combinations of, the operations outlined above with regard to the method illustrative embodiment.

These and other features and advantages of the present invention will be described in, or will become apparent to those of ordinary skill in the art in view of, the following detailed description of the exemplary embodiments of the present invention.

BRIEF DESCRIPTION OF THE SEVERAL VIEWS OF THE DRAWINGS

The invention, as well as a preferred mode of use and further objectives and advantages thereof, will best be understood by reference to the following detailed description of illustrative embodiments when read in conjunction with the accompanying drawings, wherein.

DETAILED DESCRIPTION OF THE INVENTION

As will be appreciated by one skilled in the art, the present invention may be embodied as a system, method or computer program product. Accordingly, the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, the present invention may take the form of a computer program product embodied in any tangible medium of expression having computer usable program code embodied in the medium.

Any combination of one or more computer usable or computer readable medium(s) may be utilized. The computer-usable or computer-readable medium may be, for example, but not limited to, an electronic, magnetic, optical, electromagnetic, infrared, or semiconductor system, apparatus, device, or propagation medium. More specific examples (a non-exhaustive list) of the computer-readable medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CDROM), an optical storage device, a transmission media such as those supporting the Internet or an intranet, or a magnetic storage device. Note that the computer-usable or computer-readable medium could even be paper or another suitable medium upon which the program is printed, as the program can be electronically captured, via, for instance, optical scanning of the paper or other medium, then compiled, interpreted, or otherwise processed in a suitable manner, if necessary, and then stored in a computer memory. In the context of this document, a computer-usable or computer-readable medium may be any medium that can contain, store, communicate, propagate, or transport the program for use by or in connection with the instruction execution system, apparatus, or device. The computer-usable medium may include a propagated data signal with the computer-usable program code embodied therewith, either in baseband or as part of a carrier wave. The computer usable program code may be transmitted using any appropriate medium, including but not limited to wireless, wireline, optical fiber cable, radio frequency (RF), etc.

Computer program code for carrying out operations of the present invention may be written in any combination of one or more programming languages, including an object oriented programming language such as Java™, Smalltalk™, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

The illustrative embodiments are described below with reference to flowchart illustrations and/or block diagrams of methods, apparatus (systems) and computer program products according to the illustrative embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer-readable medium that can direct a computer or other programmable data processing apparatus to function in a particular manner, such that the instructions stored in the computer-readable medium produce an article of manufacture including instruction means which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide processes for implementing the functions/acts specified in the flowchart and/or block diagram block or blocks.

The flowchart and block diagrams in the figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

Figure 1:
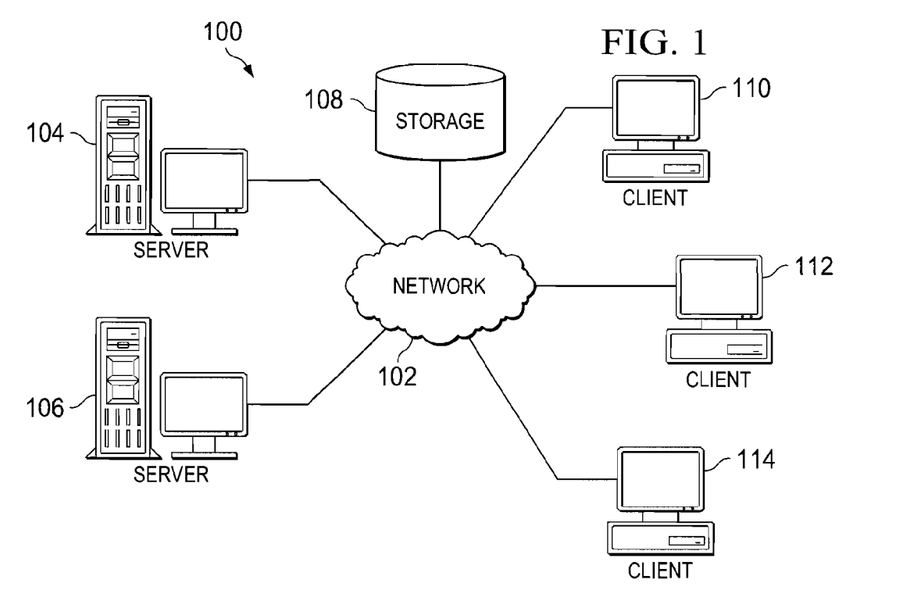
FIG. 1 is an exemplary representation of an exemplary distributed data processing system in which aspects of the illustrative embodiments may be implemented.
Figure 2:
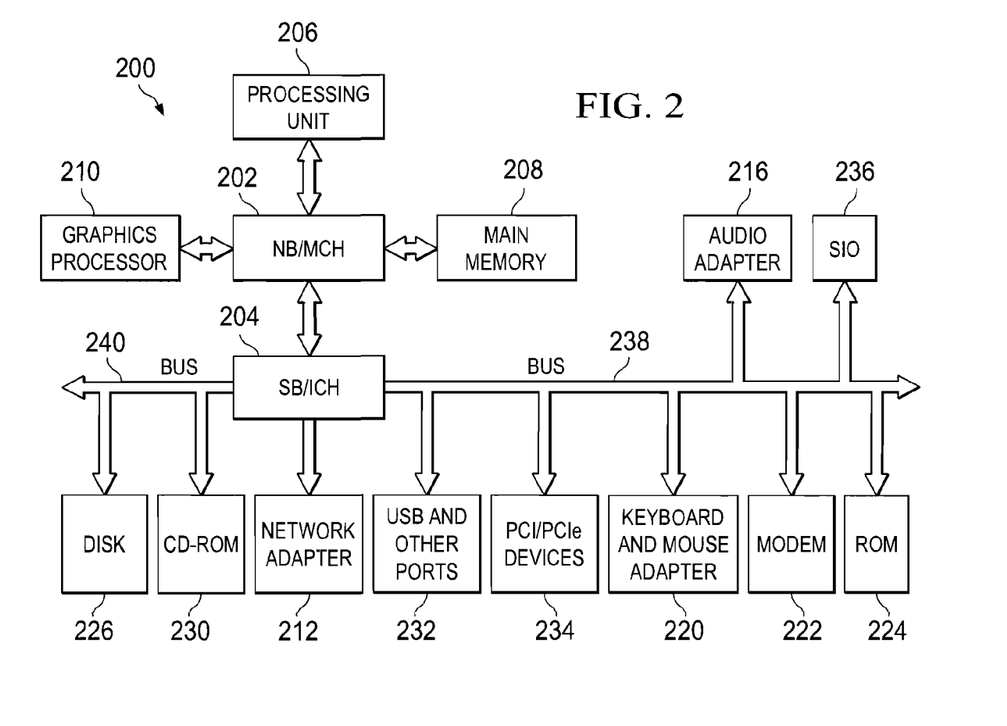
FIG. 2 is a block diagram of an exemplary data processing system in which aspects of the illustrative embodiments may be implemented.

The illustrative embodiments provide mechanisms for estimating the recovery time for data assets. As such, the mechanisms of the illustrative embodiments are especially well suited for implementation within a distributed data processing environment and within, or in association with, data processing devices, such as servers, client devices, and the like. In order to provide a context for the description of the mechanisms of the illustrative embodiments, FIGS. 1 and 2 are provided hereafter as examples of a distributed data processing system, or environment, and a data processing device, in which, or with which, the mechanisms of the illustrative embodiments may be implemented. It should be appreciated that FIGS. 1 and 2 are only exemplary and are not intended to assert or imply any limitation with regard to the environments in which aspects or embodiments of the present invention may be implemented. Many modifications to the depicted environments may be made without departing from the spirit and scope of the present invention.

With reference now to the figures, FIG. 1 depicts a pictorial representation of an exemplary distributed data processing system in which aspects of the illustrative embodiments may be implemented. Distributed data processing system 100 may include a network of computers in which aspects of the illustrative embodiments may be implemented. The distributed data processing system 100 contains at least one network 102, which is the medium used to provide communication links between various devices and computers connected together within distributed data processing system 100. The network 102 may include connections, such as wire, wireless communication links, or fiber optic cables.

In the depicted example, server 104 and server 106 are connected to network 102 along with storage unit 108. In addition, clients 110, 112, and 114 are also connected to network 102. These clients 110, 112, and 114 may be, for example, personal computers, network computers, or the like. In the depicted example, server 104 provides data, such as boot files, operating system images, and applications to the clients 110, 112, and 114. Clients 110, 112, and 114 are clients to server 104 in the depicted example. Distributed data processing system 100 may include additional servers, clients, and other devices not shown.

In the depicted example, distributed data processing system 100 is the Internet with network 102 representing a worldwide collection of networks and gateways that use the Transmission Control Protocol/Internet Protocol (TCP/IP) suite of protocols to communicate with one another. At the heart of the Internet is a backbone of high-speed data communication lines between major nodes or host computers, consisting of thousands of commercial, governmental, educational and other computer systems that route data and messages. Of course, distributed data processing system 100 may also be implemented to include a number of different types of networks, such as for example, an intranet, a local area network (LAN), a wide area network (WAN), a storage area network (SAN), or the like. As stated above, FIG. 1 is intended as an example, not as an architectural limitation for different embodiments of the present invention, and therefore, the particular elements shown in FIG. 1 should not be considered limiting with regard to the environments in which the illustrative embodiments of the present invention may be implemented.

If distributed data processing system 100 is implemented as a storage area network (SAN), the SAN may be implemented as a Fibre Channel (FC) compliant SAN. Fibre Channel is a scalable technology data transfer interface technology that maps several common transport protocols, including Internet Protocol (IP) and Small Computer System Interface (SCSI), allowing it to merge high-speed I/O and networking functionality in a single connectivity technology. Fibre Channel is a set of open standards defined by American National Standards Institute (ANSI) and International Organization for Standardization (ISO). Detailed information regarding the various Fibre Channel standards is available from ANSI Accredited Standards Committee (ASC) X3T11 (www.t11.org), which is primarily responsible for the Fibre Channel project. These standards are collectively referred to in this specification as the Fibre Channel standard or the Fibre Channel specification. Fibre Channel operates over both copper and fiber optic cabling at distances of up to 10 Kilometers and supports multiple inter-operable topologies including point-to-point, arbitrated-loop, and switching (and combinations thereof).

With reference now to FIG. 2, a block diagram of an exemplary data processing system is shown in which aspects of the illustrative embodiments may be implemented. Data processing system 200 is an example of a computer, such as client 110 in FIG. 1, in which computer usable code or instructions implementing the processes for illustrative embodiments of the present invention may be located.

In the depicted example, data processing system 200 employs a hub architecture including north bridge and memory controller hub (NB/MCH) 202 and south bridge and input/output (I/O) controller hub (SB/ICH) 204. Processing unit 206, main memory 208, and graphics processor 210 are connected to NB/MCH 202. Graphics processor 210 may be connected to NB/MCH 202 through an accelerated graphics port (AGP).

In the depicted example, local area network (LAN) adapter 212 connects to SB/ICH 204. Audio adapter 216, keyboard and mouse adapter 220, modem 222, read only memory (ROM) 224, hard disk drive (HDD) 226, CD-ROM drive 230, universal serial bus (USB) ports and other communication ports 232, and PCI/PCIe devices 234 connect to SB/ICH 204 through bus 238 and bus 240. PCI/PCIe devices may include, for example, Ethernet adapters, add-in cards, and PC cards for notebook computers. PCI uses a card bus controller, while PCIe does not. ROM 224 may be, for example, a flash binary input/output system (BIOS).

HDD 226 and CD-ROM drive 230 connect to SB/ICH 204 through bus 240. HDD 226 and CD-ROM drive 230 may use, for example, an integrated drive electronics (IDE) or serial advanced technology attachment (SATA) interface. Super I/O (SIO) device 236 may be connected to SB/ICH 204.

An operating system runs on processing unit 206. The operating system coordinates and provides control of various components within the data processing system 200 in FIG. 2. As a client, the operating system may be a commercially available operating system, such as Microsoft® Windows® XP (Microsoft and Windows are trademarks of Microsoft Corporation in the United States, other countries, or both). An object-oriented programming system, such as the Java™ programming system, may run in conjunction with the operating system and provides calls to the operating system from Java™ programs or applications executing on data processing system 200 (Java is a trademark of Sun Microsystems, Inc. in the United States, other countries, or both).

As a server, data processing system 200 may be, for example, an IBM® eServer™ System p™ computer system, running the Advanced Interactive Executive (AIX®) operating system or the LINUX® operating system (eServer, System p and AIX are trademarks of International Business Machines Corporation in the United States, other countries, or both while LINUX is a trademark of Linus Torvalds in the United States, other countries, or both). Data processing system 200 may be a symmetric multiprocessor (SMP) system including a plurality of processors in processing unit 206. Alternatively, a single processor system may be employed.

Instructions for the operating system, the object-oriented programming system, and applications or programs are located on storage devices, such as HDD 226, and may be loaded into main memory 208 for execution by processing unit 206. The processes for illustrative embodiments of the present invention may be performed by processing unit 206 using computer usable program code, which may be located in a memory, such as, for example, main memory 208, ROM 224, or in one or more peripheral devices 226 and 230, for example.

A bus system, such as bus 238 or bus 240 as shown in FIG. 2, may be comprised of one or more buses. Of course, the bus system may be implemented using any type of communication fabric or architecture that provides for a transfer of data between different components or devices attached to the fabric or architecture. A communication unit, such as modem 222 or network adapter 212 of FIG. 2, may include one or more devices used to transmit and receive data. A memory may be, for example, main memory 208, ROM 224, or a cache, such as found in NB/MCH 202 in FIG. 2.

Those of ordinary skill in the art will appreciate that the hardware in FIGS. 1 and 2 may vary depending on the implementation. Other internal hardware or peripheral devices, such as flash memory, equivalent non-volatile memory, or optical disk drives and the like, may be used in addition to or in place of the hardware depicted in FIGS. 1 and 2. Also, the processes of the illustrative embodiments may be applied to a multiprocessor data processing system, other than the SMP system mentioned previously, without departing from the spirit and scope of the present invention.

Moreover, the data processing system 200 may take the form of any of a number of different data processing systems including client computing devices, server computing devices, a tablet computer, laptop computer, telephone or other communication device, a personal digital assistant (PDA), or the like. In some illustrative examples, data processing system 200 may be a portable computing device which is configured with flash memory to provide non-volatile memory for storing operating system files and/or user-generated data, for example. Essentially, data processing system 200 may be any known or later developed data processing system without architectural limitation.

The illustrative embodiments provide a new level of correlated analysis of estimating the recovery time for data assets. While known systems provide for reporting, monitoring, and analysis of backup operations, those known systems do not perform these functions for all of the different types of backup and recovery options that are available for the data asset. One illustrative embodiment of the present invention provides for the discovery, monitoring, and reporting of different types of backup and recovery options, such as traditional backup, block level continuous data protection, file level continuous data protection, application replication, and the like, that are available for the data asset, which may be a file, file system, database table, application, server, or the like. This illustrative embodiment provides an assessment of recovery times for data assets based on the recovery times associated with current data assets and/or processing sample data to determine the recovery time for a given data asset.

In addition, another illustrative embodiment generates a recovery health index for a data asset based on one or more estimated recovery times and/or current recovery times. The recovery health index uses a recovery health status indicator to represent the overall recoverability of data assets. This recovery health index presents a summary view of the correlated analysis of data recovery readiness for the data asset. This illustrative embodiment may also take into consideration recovery rate input factors associated with the backup configuration, the data repositories, or the like.

Figure 3:
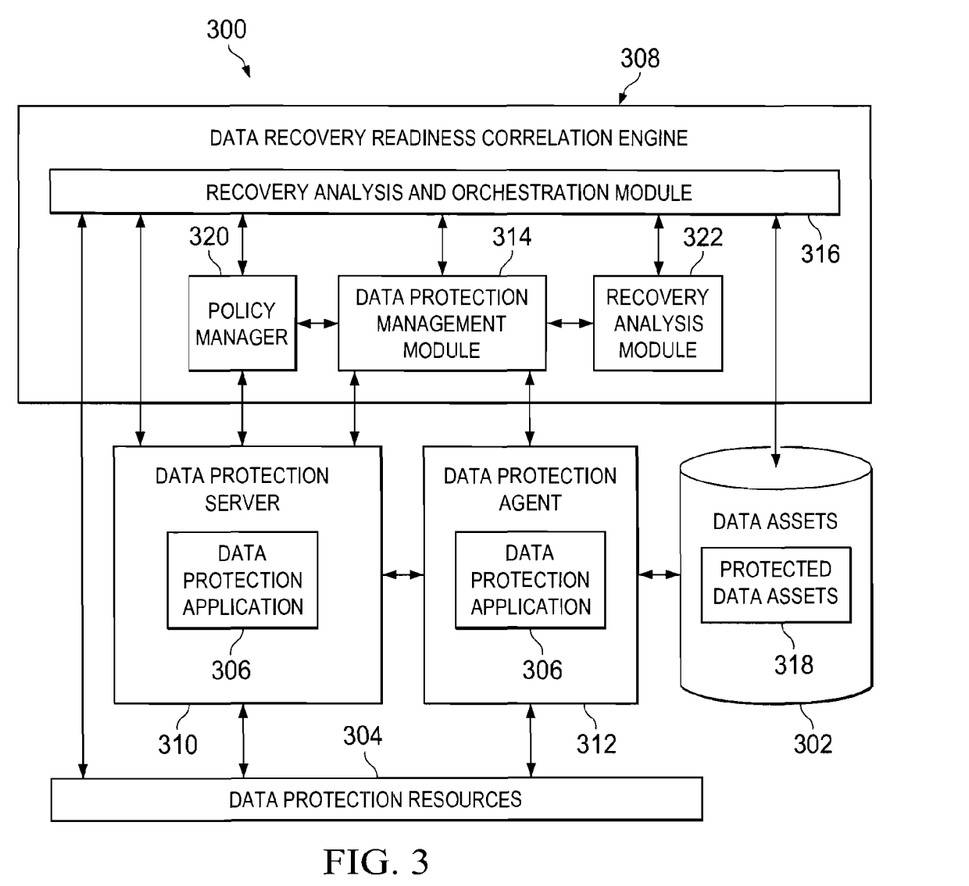
FIG. 3 is an exemplary diagram illustrating the primary operational elements for assessing data recovery readiness for data assets of an illustrative embodiment.

FIG. 3 is an exemplary diagram illustrating the primary operational elements for assessing data recovery readiness for data assets of an illustrative embodiment. As shown in FIG. 3, recovery system 300 includes data assets 302, data protection resources 304, data protection application 306, and data recovery readiness correlation engine 308. Data assets 302 may comprise items, such as files, file systems, databases, applications, servers, or the like, that are used by users, such as businesses, enterprises, individuals, or the like, who may require recovery services. Data protection resources 304, which are resources that are used to backup data assets 302 during the data protection process, may comprise items, such as tape drives, disk drives, replication utilities, data retention appliances, or the like, with which data assets 302 are protected. Data protection application 306 may comprise recovery and backup applications executed on data protection server 310, data protection agent 312, or the like, by which data assets 302 are recovered or backed-up on data protection resources 304. Data protection application 306 may be an application that runs entirely on data protection server 310 or data protection agent 312, or a multi-node application where the functions of data protection application 306 are distributed across many different servers and agents, such as data protection server 310 and data protection agent 312.

Data protection application 306 may store and retrieve data from protected data assets 318, which are a subset of data assets 302 that require monitoring for recovery readiness, using known network based protocols and transmissions of data to and from data protection server 310 or data protection agent 312. Data protection application 306 may further manage the data from protected data assets 318 by storing or retrieving the data to or from data protection resources 304. Alternatively, data protection application 306 may store or retrieve the backed-up data of protected data assets 318 directly from data protection resources 304. Through a coordinated use of data protection resources 304 with data protection application 306 and while using advance storage capabilities, such as storage area networks (SANs) and fibre channel (FC) protocols, data protection agent 312 may have direct access to data protection resources 304. Therefore, data protection application 306 performs a data protection operation by reading data from protected data assets 318 and transferring the data to a targeted one of data protection resources 304, or reading the data from data protection resources 304 and writing the data to protected data assets 318.

Data recovery readiness correlation engine 308 may include data protection management module 314 and recovery analysis and orchestration (RAO) module 316. Data protection management module 314 may manage data protection application 306, which is executed on data protection server 310 and/or data protection agent 312. Data protection management module 314 may evaluate the data from protected data assets 318 and data assets 302 in terms of where the data is located and the importance of the data to the user. Similarly, data protection management module 314 may be responsible for evaluating and determining what data protection methodologies are being deployed to protect the data on data assets 302, specifically the data in protected data assets 318. Data protection management module 314 may keep track of the physical storage resources provisioned and in use in data protection resources 304, protected data assets 318 backed-up on data protection resources 304, data transfer rates as data is moved between protected data assets 318 and data protection resources 304, data placement correlation to know where data is kept on data assets 302 or data protection resources 304, and/or the like.

For example, while a primary copy of the data resides in protected data assets 318, a backup or replica copy of the data may exist in data protection resources 304. The replica may have been created by data protection application 306 running on data protection server 310 and/or data protection agent 312. Data protection application 306 may have created the backup or replica copy of the data on data protection resources 304 using a hardware level disk snapshot, a software copy command, or the like.

Both data protection management module 314 and data protection application 306 may use one or more databases to store various types of information regarding the data in protected data assets 318 that is being backed-up or recovered. Data protection application 306 may track metadata that describes the data in protected data assets 318, the location of the data on data protection resources 304, or the like. Similarly, data protection management module 314 may also track data assets 302 in terms of the type of data, the location of the data in data assets 302, protected data assets 318, data transfer times, other descriptive information about that data, and/or the like. Data protection management module 314 and data protection application 306 may use various discovery technologies, such as agents and standards based discovery application programming interfaces (APIs), to collect the information about the data protection resources 304 and data assets 302.

RAO module 316 may interact with the data protection management module 314, data protection server 310, data assets 302, and/or data protection resources 304 in order to discover or retrieve a variety of information to determine the data recovery readiness for data assets 302 that require protection, such as:

1. RAO module 316 may coordinate with and interrogate information from data protection management module 314, data protection application 306, and/or data protection resources 304, in order to obtain a comprehensive view of protected data assets 318 and how protected data assets 318 are to be backed-up and retrieved.

2. RAO module 316 may coordinate with and interrogate information from data protection management module 314, data protection application 306, and/or data protection resources 304, in order to retrieve information regarding the status and recent history of backup operations performed for each of protected data assets 318 that require protection.
3. RAO module 316 may retrieve information from data protection management module 314 regarding the availability and types of backup and recovery options, such as traditional backup, block level continuous data protection, file level continuous data protection, application replication, other replication technology, or the like.
4. RAO module 316 may retrieve status information from data protection resources 304 required to recover data in order to control the operations of data protection resources 304.
5. RAO module 316 may retrieve information from data protection application 306 and/or data protection management module 314, pertaining to recovery service level agreements and/or disaster recovery plans that might apply to protected data assets 318.

Thus, RAO module 316 may interrogate data protection management module 314 and/or data protection application 306 running on data protection server 310 to determine the type of data protection and methodology, referred to herein as metrics, being applied to each of protected data assets 318. RAO module 316 may also collect metric information on how the existing backup operation performs, such as time required for current operation to complete, size of data asset to be protected, number of channels available to protect the data asset, throughput rates achieved for the backup operation, resources used to perform the backup, and the like.

In order to perform a correlated analysis of data recovery readiness, RAO module 316 may solicit a set of recovery policies from policy manager 320 associated with data protection management module 314 and/or data protection application 306 running on data protection server 310. Policy manager 320 may include attributes, such as the scope of the policy, the recovery objective of the policy, or the like. The scope of the policy refers to the data assets covered by the policy, such as a file, directory, drive, server, or application. The recovery objective of the policy refers to the type of recovery operation to be enforced, such as recovery point, recovery time, or the like.

Once RAO module 316 has identified the recovery policies and the metrics, RAO module 316 may then apply the recovery operation associated with each data asset in protected data assets 318 using the metrics that were collected for that data asset. The metrics are applied in such a way as to establish a recovery health index (RHI) for each of protected data assets 318. The RHI may be derived by using the information for the backup(s) of protected data assets 318 as being a representative indication of the restore capacity and throughput that could be achieved during recovery of protected data assets 318. Thus, if protected data assets 318 are managed using a recovery time objective (RTO), then RAO module 316 may compare the available recent backup information, such as transfer times, amount of data, backup location, or the like, compared to the recovery time objective desired for each of protected data assets 318. If the RTO is for recovery in 120 minutes or less, RAO module 316 uses the time it takes to perform the backup for each of protected data assets 318 divided by the RTO to establish the RHI for each of protected data assets 318. For example, if the time it takes to perform the backup for a given data asset is 130 minutes, then the RHI would be 130/120=1.08. RAO module 316 may then use an algorithm to alert or take action for each of protected data assets 318 with a RHI greater than a predetermined value, such as 1.0. RAO module 316 identifies each of protected data assets 318 where the RHI is equal to or less than the predetermined value as being adequately provided for recovery based on the existing approach.

RAO module 316 may also use the RHI algorithm to determine if a recovery point objective (RPO) may be met. For example, if one of protected data assets 318 has an RPO of a snapshot or image 12 times per day, RAO module 316 considers the type of snapshot technology being used and a frequency that the snapshot is being captured. The determination made by RAO module 316 depends upon the reporting capabilities of data protection management module 314, the capabilities of data protection application 306, and/or monitoring of protected data assets 318.

The following pseudo-code illustrates how this RHI algorithm would work for the various ones of protected data assets 318 being considered:
 If scope is a single FILE,
  Look at the backup time for a given file.
  Compare the backup time to the specified RTO value.
  Flag all files that were not backed up within the specified RTO value.
 If scope is a DIRECTORY,
  Look at all files assigned to the directory.
  Evaluate backup processing to determine minimum, average, and maximum number of sessions used to backup the directory.
  Evaluate prominent restore scenario to determine the nominal amount of restore streams that would be used.
  Sum the total minutes of backup time for all qualifying files in the directory.
  Divide the total minutes by the nominal number of restore sessions that would be assigned.
   This calculation provides an estimated RTO that would be achieved for a restore of the directory.
  If the estimated RTO achieved for the directory exceeds the specified RTO, flag the directory and all files within it as being outside the objective.
 If scope is a DRIVE, such as a file space,
  Look at all files assigned to the file space.
  Evaluate backup processing to determine minimum, average, and maximum number of sessions used to backup the file space.
  Evaluate prominent restore scenario to determine the nominal amount of restore streams that would be used.
  Sum the total minutes of backup time for all qualifying files in the file space.
  Divide the total minutes by the nominal number of restore sessions that would be assigned.
   This calculation provides an estimated RTO that would be achieved for a restore of the file space.
  If the estimated RTO achieved for the file space exceeds the specified RTO, flag the file space and all files within it as being outside the objective.
 If scope is a SERVER,
  Run DRIVE pseudo-code for all drives on the server.
 If scope is an APPLICATION, such as a database application,
  Determine the data assets, such as files, directories, drives, and/or servers, that make up the application.
  Loop through each data asset, accumulating the estimated recovery times according to the specific pseudo-code for the data asset above.

This calculation provides an estimated RTO that would be achieved for a restore of this entire application.

For those ones of protected data assets 318 with an RHI equal to or less than the predetermined value, RAO module 316 may identify those data assets as needing no change. For those ones of protected data assets 318 with an RHI greater than the predetermined value, RAO module 316 may identify those data assets as not being able to meet the required recovery needs and additional actions may be needed.

Once RAO module 316 identifies the particular ones of protected data assets 318 for which recovery system 300 is able to meet the required recovery needs, RAO module 316 may then evaluate the devices, snapshots, or other resources needed to recover those data assets. RAO module 316 may evaluate the resources used for the recovery compared to those available for the recovery. That is, RAO module 316 analyzes the data protection resources of data protection resources 304 that are used to protect the particular data asset being evaluated and the remaining ones of data protection resources 304 that are available for data protection. If RAO module 316 determines that the required data protection resources are not readily available, then RAO module 316 may update the RHI to reflect that recovery may not be possible and would list the resources that are needed which may not be available. Similarly, RAO module 316 may make recommendations about alternate data protection approaches that could be used to satisfy the recovery policies for protected data assets 318.

Once RAO module 316 identifies the particular ones of protected data assets 318 for which recovery system 300 is not able to meet the required recovery needs, RAO module 316 may determine if a policy could be implemented that would enable recovery system 300 to meet the required recovery needs. RAO module 316 may analyze each of protected data assets 318 for which recovery system 300 is not able to meet the required recovery needs, may analyze the data protection application 306 and interfaces available for effecting a change, and may analyze the data protection resources 304 that are available.

If RAO module 316 determines that a recovery policy could be implemented that would meet the required recovery needs of protected data assets 318, then RAO module 316 may automatically implement the determined recovery policy based upon user preferences. Otherwise, RAO module 316 may alert an administrator of the determined recovery policy, so that the administrator may implement the recovery policy. If RAO module 316 fails to determine a recovery policy that could be implemented that would meet the required recovery needs of protected data assets 318, RAO module 316 may alert an administrator that a recovery policy to meet the required recovery needs of protected data assets 318 could not be determined.

In addition to RAO module 316 identifying the particular ones of protected data assets 318 for which recovery system 300 is or is not able to meet the required recovery needs, RAO module 316 may also project data recovery times using an associated recovery analysis module 322 for a test recovery configuration using a repository in data protection resources 304 or a simulated repository by testing a test repository configuration on an existing repository in data protection resources 304 or a simulated repository with a repeating pre-defined data workload. For instance, recovery analysis module 322 may read and write a defined 100 MB pattern 10 times using a test recovery configuration to an existing repository in data protection resources 304. Based on this result, the recovery factor value for that test recovery configuration and repository may be determined and assigned for use in enhanced RHI calculations.

An exemplary calculation of the estimated recovery time for a given data asset and further used in the calculation of the enhanced RHI based on recovery metrics may be the following equation:

$$\text{Recovery\_Time}_{data\ asset} = ((D_1/(R_1 * F_1)) + (D_2/(R_2 * F_2)) + (D_n/(R_n * F_n)))$$

In this exemplary equation the $\text{Recovery\_Time}_{data\ asset}$ represents the total estimated time for recovery for a data asset. $D_1, D_2, \ldots, D_n$ represent amounts of data stored in backup configurations (e.g., repositories) for a given data asset. $R_1, R_2, \ldots, R_n$ may represent estimated recovery throughput rates (amount of data per time period) for recovery configurations on one or more repositories in data protection resources 304. The throughput rates may be determined by any recovery operation that occurred from the specific backup configuration or repository. These recovery throughput rates are associated with each backup data configuration or repository and are continually updated to reflect total average recovery throughput rates (over time). Alternatively, $R_1, R_2, \ldots, R_n$ may represent recovery times that may be projected for a given test recovery configuration on an existing repository in data protection resources 304 or simulated repository by testing the repository with a repeating predefined data workload as shown in the above example. If existing recovery time or projected recovery times are not available, recovery analysis module 322 may also use predefined backup throughput rates for the data asset.

$F_1, F_2, \ldots, F_n$ represent recovery rate impact factors associated with each of different existing or test recovery configurations, repositories, or the like. Recovery rate impact factors are introduced to represent impacts to recovery times and may represent different recovery time characteristics of each possible configuration or repository for backing up data, such as distinct time delays associated with network connections, repositories, or the like. For example, a time associated with mounting a tape drive or that normal production "connectivity" between a storage resource and recovery target has throughput rate of x, such as GB Ethernet; however, in a recovery scenario, the connectivity may be limited to 100 MB Ethernet. As such, the recovery rate input factors may be used to denote differences in capacity or capability in the infrastructure being used. The recovery rate input factors may be applied to estimate recovery times for each existing or test recovery configuration on an existing repository in data protection resources 304 or simulated repository (e.g., a recovery rate impact factor of 0.9 would result in a slower recovery data rate estimated for a given configuration or repository). Recovery rate impact factors may either be set by the recovery analysis module 322 or may be configurable by the user.

Figure 4:
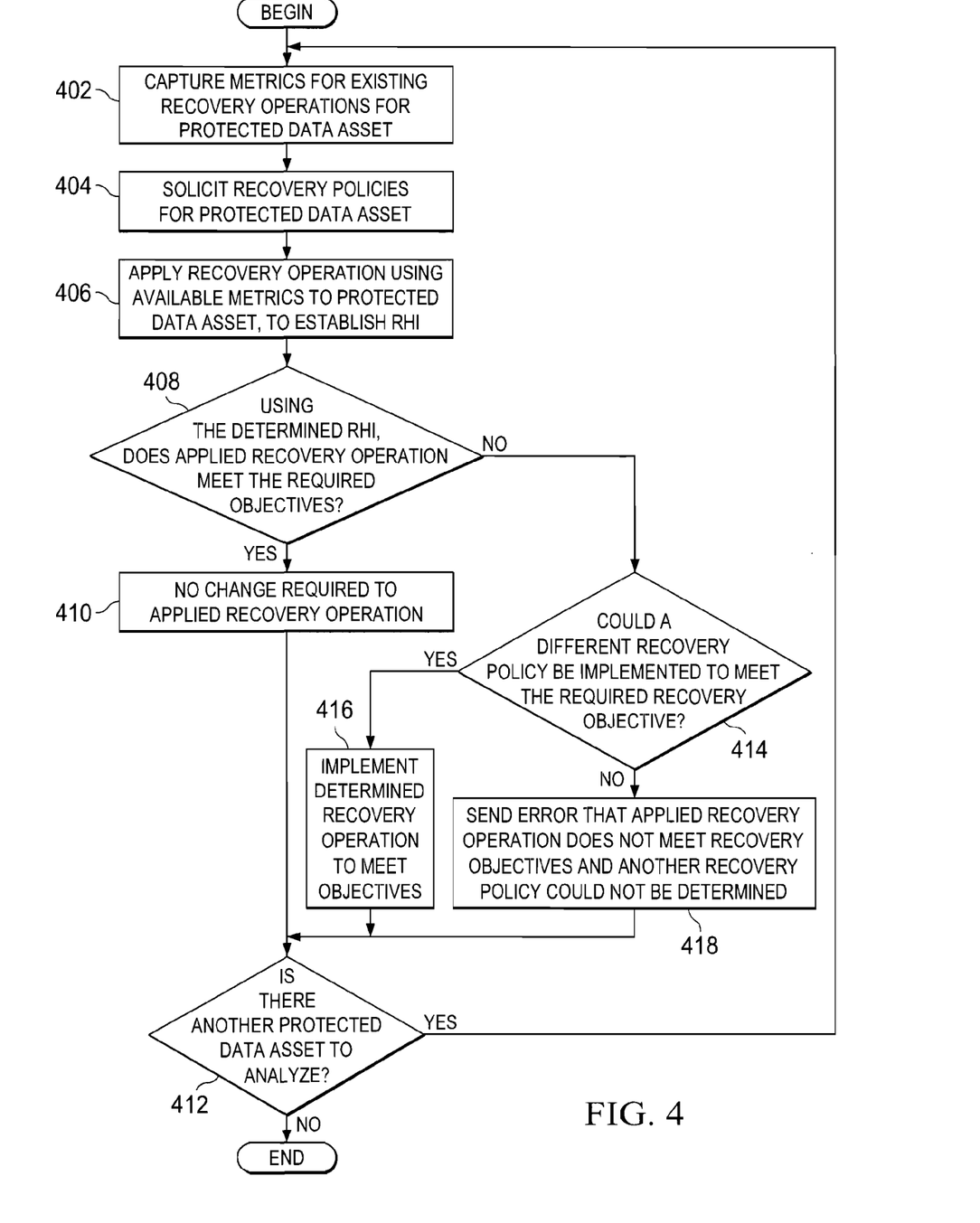
FIG. 4 is a flowchart outlining an exemplary operation for assessing data recovery readiness for a data asset according to the illustrative embodiments.

FIG. 4 is a flowchart outlining an exemplary operation for assessing data recovery readiness for a data asset according to the illustrative embodiments. As the operation begins, a recovery analysis and orchestration (RAO) module interrogates the data protection management module and/or the data protection applications to determine metrics for a current recovery operation that is being applied to the protected data asset (step 402). Once the RAO module obtains the metrics for existing recovery operations that are being applied to the protected data asset, the RAO module solicits a set of recovery policies for a protected data asset from an appropriate policy manager within a data protection management module and/or a data protection applications running on a data protection server (step 404). Using the identified metrics, the RAO module applies the current recovery operation to the protected data asset using the metrics that were collected (step 406). The metrics are applied in such a way as to establish a recovery health index (RHI) for the protected data asset. The RAO module may then use an RHI algorithm to determine if the applied recovery operation meets the required objectives of the protected data asset (step 408).

If at step 408 the applied recovery operation meets the required objective for the protected data asset, then the RAO module identifies the protected data asset as needing no change for the applied recovery operation (step 410). The RAO module then determines if there is another protected data asset to analyze (step 412). If at step 412 there is an additional protected data asset to analyze, then the operation returns to step 402. If at step 412 there is not an additional protected data asset to analyze, then the operation ends.

If at step 408 the applied recovery operation fails to meet the required objective for the protected data asset, then the RAO module determines if a recovery policy could be implemented that would meet the required recovery needs for the protected data asset (step 414). If at step 414 the RAO module determines a recovery policy that could be implemented that would meet the required recovery needs of the protected data asset, then the RAO module may implement the determined recovery policy automatically based upon user preferences (step 416), with the operation continuing to step 412 thereafter. If at step 414 the RAO module fails to determine a recovery policy that could be implemented that would meet the required recovery needs of the protected data asset, then the RAO module sends an error that the applied recovery operation does not meet recovery objectives and another recovery policy could not be determined (step 418), with the operation continuing to step 412 thereafter.

Figure 5A:
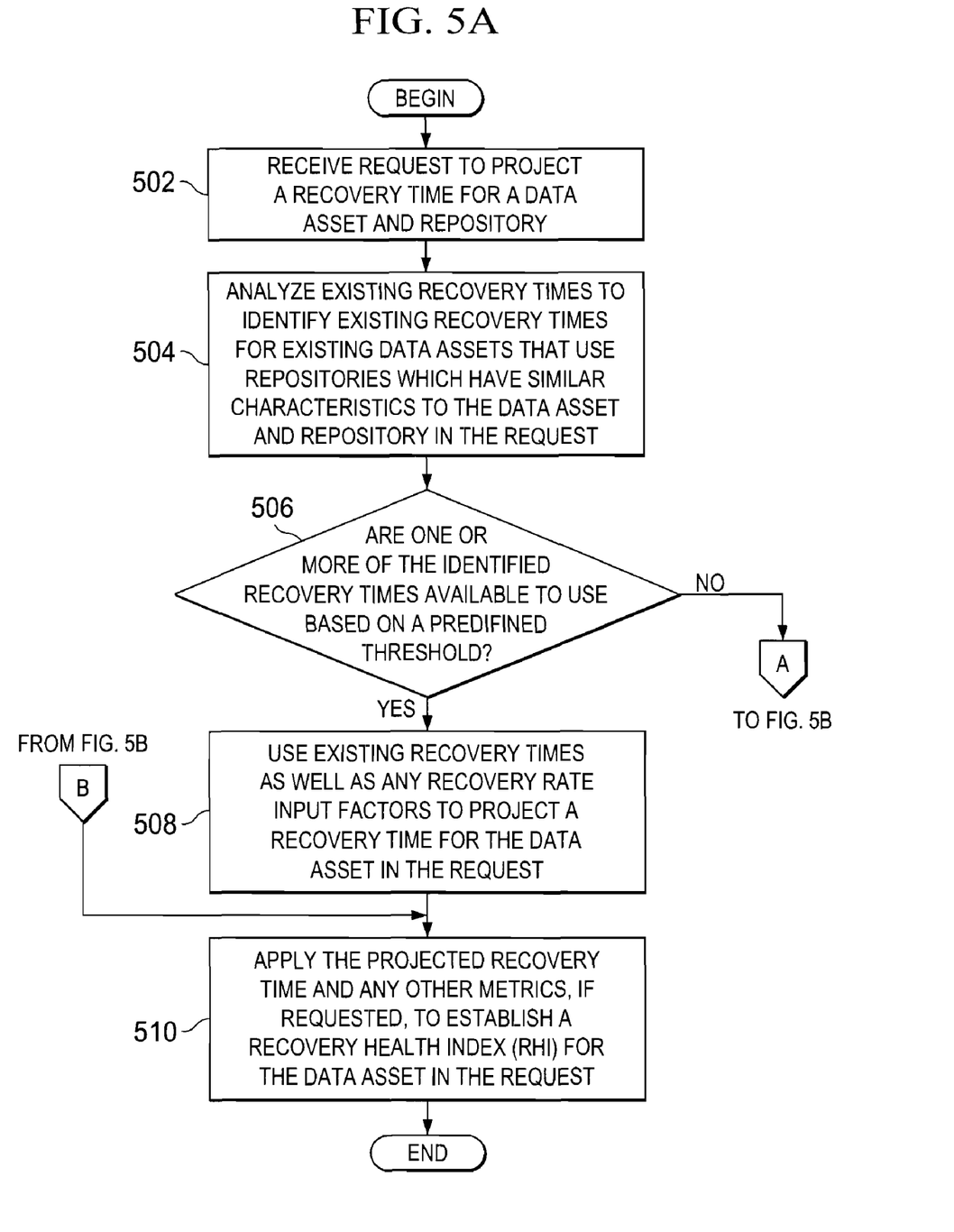
FIGS. 5A and 5B depict a flowchart outlining an exemplary operation for estimating the recovery time of a data asset according to the illustrative embodiments.
Figure 5B:
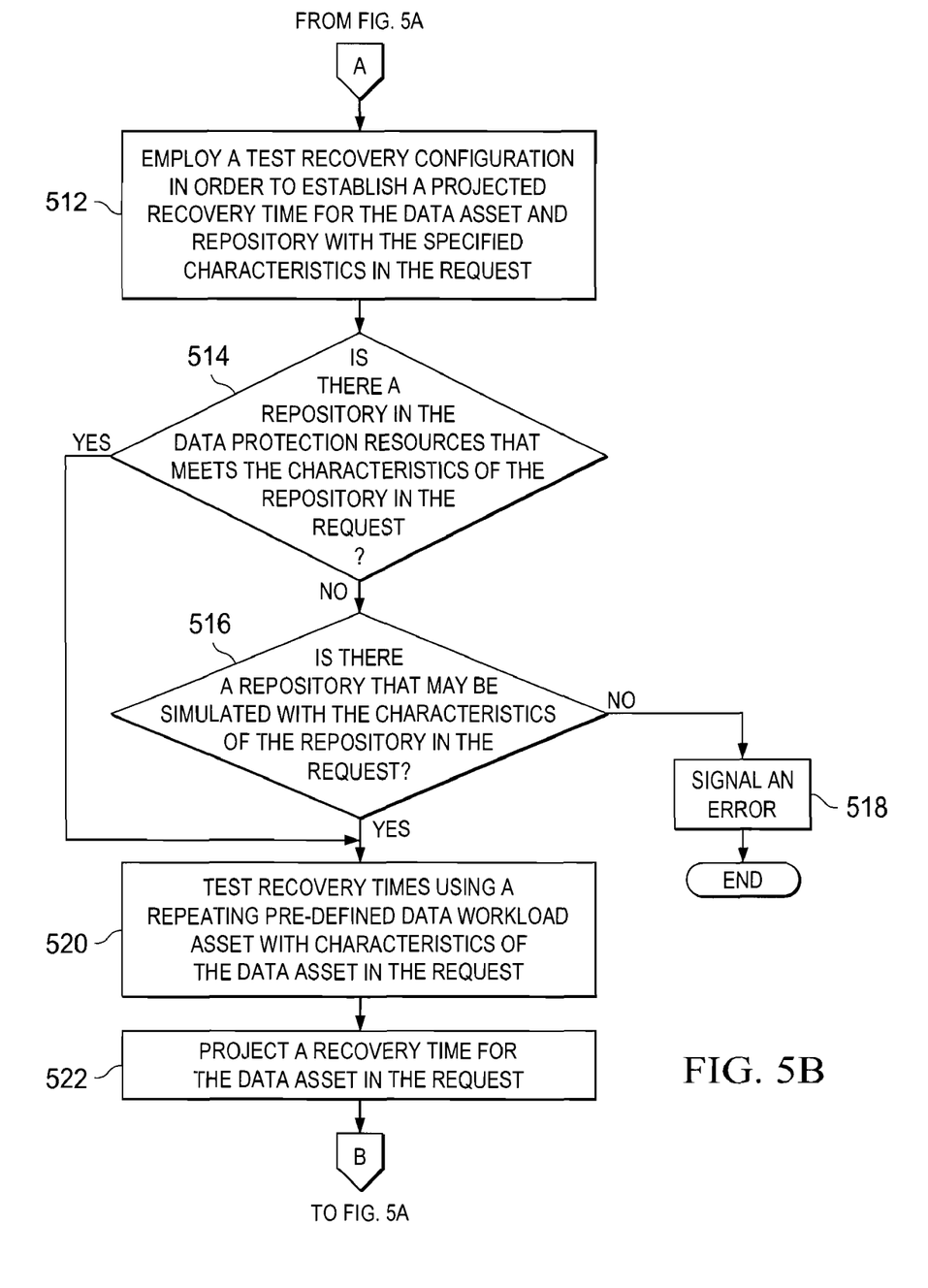

FIGS. 5A and 5B depict a flowchart outlining an exemplary operation for estimating the recovery time of a data asset according to the illustrative embodiments. As the operation begins, a recovery analysis and orchestration (RAO) module receives a request to project a recovery time for a data asset with specified characteristics to a repository with specified characteristics (step 502). A recovery analysis module associated with the RAO module analyzes existing recovery times to identify existing recovery times for data assets that use repositories which have similar characteristics to the data asset and repository in the request (step 504). Based on a predefined threshold, recovery analysis module determines if one or more of the identified recovery times are available to use (step 506). If at step 506 the existing recovery times are usable, the recovery analysis module uses the existing recovery times as well as any recovery rate input factors to project a recovery time for the data asset in the request (step 508). The RAO module may then go one step further and apply the projected recovery time and any other metrics, if requested, to establish an enhanced recovery health index (RHI) for the data asset in the request (step 510), with the operation ending thereafter.

If at step 506 the existing recovery times are not usable, then recovery analysis module employs a test recovery configuration in order to establish a projected recovery time for the data asset and repository with the specified characteristics in the request (step 512). Once the test recovery configuration is identified, recovery analysis module determines if there is a repository in the data protection resources that meets the characteristics of the repository in the request (step 514). If at step 514 the recovery analysis module is unable to identify a repository in the data protection resources that meets the characteristics of the repository in the request, the recovery analysis module determines if a repository may be simulated with the characteristics of the repository in the request (step 516). If at step 516 the recovery analysis module determines that a repository with characteristics of the repository in the request may not be simulated, then the recovery analysis module signals an error (step 518), with the operation ending thereafter.

If at step 514 the recovery analysis module identifies a repository in the data protection resources that meets the characteristics of the repository in the request or if at step 516 the recovery analysis module determines that a repository with characteristics of the repository in the request may be simulated, the recovery analysis module then uses the identified repository or simulated repository to test recovery times using a repeating pre-defined data workload asset with characteristics of the data asset in the request (step 520). Once the recovery analysis module receives the test recovery times, the recovery analysis module may use the test recovery times as well as any recovery time input factors to project a recovery time for the data asset in the request (step 522), with the operation proceeding to step 510 thereafter.

Thus, the illustrative embodiments provide for estimating recovery times for data assets. This illustrative embodiment provides an assessment of recovery times for data assets based on the recovery times associated with current data assets and/or processing sample data to determine a recovery time for a given data asset. The illustrative embodiments may also provide for a recovery health index for the data asset that may be used for a correlated analysis of data recovery readiness for the data asset.

As noted above, it should be appreciated that the illustrative embodiments may take the form of an entirely hardware embodiment, an entirely software embodiment or an embodiment containing both hardware and software elements. In one exemplary embodiment, the mechanisms of the illustrative embodiments are implemented in software or program code, which includes but is not limited to firmware, resident software, microcode, etc.

A data processing system suitable for storing and/or executing program code will include at least one processor coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution.

Input/output or I/O devices (including but not limited to keyboards, displays, pointing devices, etc.) can be coupled to the system either directly or through intervening I/O controllers. Network adapters may also be coupled to the system to enable the data processing system to become coupled to other data processing systems or remote printers or storage devices through intervening private or public networks. Modems, cable modems and Ethernet cards are just a few of the currently available types of network adapters.

The description of the present invention has been presented for purposes of illustration and description, and is not intended to be exhaustive or limited to the invention in the form disclosed. Many modifications and variations will be apparent to those of ordinary skill in the art. The embodiment was chosen and described in order to best explain the principles of the invention, the practical application, and to enable others of ordinary skill in the art to understand the invention for various embodiments with various modifications as are suited to the particular use contemplated.

What is claimed is:

1. A computer program product comprising a non-transitory computer useable medium having a computer readable program, wherein the computer readable program, when executed in a data processing system, causes the data processing system to:
- receive a request to project a recovery time for a data asset that uses a repository;
- determine whether there are a plurality of existing recovery times for other data assets and other repositories that have characteristics similar to the data asset and the repository of the request;
- responsive to an existence of the plurality of existing recovery times, project the recovery time for the data asset using the plurality of existing recovery times and one or more recovery rate input factors, wherein the one or more recovery rate input factors are recovery time characteristics of one or more test recovery configurations or the other repositories associated with the plurality of existing recovery times; and
- calculate an enhanced recovery health index associated with the data asset of the request using a recovery health index function that determines the enhanced recovery health index by dividing the projected recovery time with a requested recovery time of the data asset.

2. The computer program product of claim 1, wherein the computer readable program to project the recovery time further includes computer readable program that causes the computing device to:
- employ a recovery time function to project the recovery time, wherein the recovery time function is:

$$\text{Recovery\_Time}_{data\ asset} = ((D_1/(R_1 * F_1)) + (D_2/(R_2 * F_2)) + \ldots + (D_n/(R_n * F_n)))$$

where $D_1, D_2, \ldots, D_n$ are amounts of data stored in the respective ones of the other repositories, where $R_1, R_2, \ldots, R_n$ are estimated recovery throughput rates for respective recovery configurations associated with the respective ones of the other repositories, and where $F_1, F_2, \ldots, F_n$ are recovery rate impact factors associated with the respective recovery configurations associated with the respective ones of the other repositories.

3. The computer program product of claim 1, wherein the computer readable program further causes the data processing system to:
- responsive to an absence of the plurality of existing recovery times, identify a test recovery configuration that will establish a projected recovery time for the data asset of the request;
- determine if there is at least one existing repository that has similar characteristics to the repository in the request;
- responsive to an existence of the at least one existing repository, generate test recovery times by using the test recovery configuration, the at least one existing repository, and a pre-defined data workload asset with characteristics of the data asset of the request; and
- project the recovery time for the data asset using the test recovery times.

4. The computer program product of claim 3, wherein the computer readable program to project the recovery time using the test recovery times further includes computer readable program that causes the computing device to:
- project the recovery time for the data asset using the one or more test recovery times and one or more recovery rate input factors, wherein the one or more recovery rate input factors are recovery time characteristics of the test recovery configuration and the at least one existing repository.

5. The computer program product of claim 4, wherein the computer readable program to project the recovery time using the test recovery times further includes computer readable program that causes the computing device to:
- project the recovery time for the data asset using the test recovery times and one or more recovery rate input factors, wherein the one or more recovery rate input factors are recovery time characteristics of the test recovery configuration and the simulated repository.

6. The computer program product of claim 3, wherein the computer readable program further causes the data processing system to:
- responsive to an absence of the existing repository, generate a simulated repository that has similar characteristics to the repository in the request;
- generate the test recovery times by using the test recovery configuration, the simulated repository, and the pre-defined data workload asset with characteristics of the data asset of the request; and
- project the recovery time for the data asset using the test recovery times.

7. An apparatus, comprising:
- a processor; and
- a memory coupled to the processor, wherein the memory comprises instructions which, when executed by the processor, cause the processor to:
- receive a request to project a recovery time for a data asset that uses a repository;
- determine if there are a plurality of existing recovery times for other data assets and other repositories that have characteristics similar to the data asset and the repository of the request;
- responsive to an existence of the plurality of existing recovery times, project the recovery time for the data asset using the plurality of existing recovery times and one or more recovery rate input factors, wherein the one or more recovery rate input factors are recovery time characteristics of one or more test recovery configurations or the other repositories associated with the plurality of existing recovery times; and
- calculate an enhanced recovery health index associated with the data asset of the request using a recovery health index function that determines the enhanced recovery health index by dividing the projected recovery time with a requested recovery time of the data asset.

8. The apparatus of claim 7, wherein the instructions to project the recovery time further cause the processor to:
- employ a recovery time function to project the recovery time, wherein the recovery time function is:

$$\text{Recovery\_Time}_{data\ asset} = ((D_1/(R_1 * F_1)) + (D_2/(R_2 * F_2)) + \ldots + (D_n/(R_n * F_n)))$$

where $D_1, D_2, \ldots, D_n$ are amounts of data stored in the respective ones of the other repositories, where $R_1, R_2, \ldots, R_n$ are estimated recovery throughput rates for respective recovery configurations associated with the respective ones of the other repositories, and where $F_1, F_2, \ldots, F_n$ are recovery rate impact factors associated with the respective recovery configurations associated with the respective ones of the other repositories.

9. The apparatus of claim 7, wherein the instructions further cause the processor to:
responsive to an absence of the plurality of existing recovery times, identify a test recovery configuration that will establish a projected recovery time for the data asset of the request;
determine if there is at least one existing repository that has similar characteristics to the repository in the request;
responsive to an existence of the at least one existing repository, generate test recovery times by using the test recovery configuration, the at least one existing repository, and a pre-defined data workload asset with characteristics of the data asset of the request; and
project the recovery time for the data asset using the test recovery times.

10. The apparatus of claim 9, wherein the instructions to project the recovery time using the test recovery times further cause the processor to:
project the recovery time for the data asset using the one or more test recovery times and one or more recovery rate input factors, wherein the one or more recovery rate input factors are recovery time characteristics of the test recovery configuration and the at least one existing repository.

11. The apparatus of claim 10, wherein the instructions to project the recovery time using the test recovery times further cause the processor to:
project the recovery time for the data asset using the test recovery times and one or more recovery rate input factors, wherein the one or more recovery rate input factors are recovery time characteristics of the test recovery configuration and the simulated repository.

12. The apparatus of claim 9, wherein the instructions further cause the processor to:
responsive to an absence of the existing repository, generate a simulated repository that has similar characteristics to the repository in the request;
generate the test recovery times by using the test recovery configuration, the simulated repository, and the pre-defined data workload asset with characteristics of the data asset of the request; and
project the recovery time for the data asset using the test recovery times.

13. A method for estimating a recovery time for a data asset, the method comprising:
receiving a request to project a recovery time for a data asset that uses a repository;
determining if there are a plurality of existing recovery times for other data assets and other repositories that have characteristics similar to the data asset and the repository of the request;
responsive to an existence of the plurality of existing recovery times, projecting the recovery time for the data asset using the plurality of existing recovery times and one or more recovery rate input factors, wherein the one or more recovery rate input factors are recover time characteristics of one or more test recovery configurations or the other repositories associated with the plurality of existing recovery times; and
calculating an enhanced recovery health index associated with the data asset of the request using a recovery health index function that determines the enhanced recovery health index by dividing the projected recovery time with a requested recovery time of the data asset.

14. The method of claim 13, wherein projecting the recovery time further comprises:
employing a recovery time function to project the recovery time, wherein the recovery time function is:

$$\text{Recovery\_Time}_{data\ asset} = ((D_1/(R_1*F_1)) + (D_2/(R_2*F_2)) + \ldots + (D_n/(R_n*F_n)))$$

where $D_1, D_2, \ldots, D_n$ are amounts of data stored in the respective ones of the other repositories, where $R_1, R_2, \ldots, R_n$ are estimated recovery throughput rates for respective recovery configurations associated with the respective ones of the other repositories, and where $F_1, F_2, \ldots, F_n$ are recovery rate impact factors associated with the respective recovery configurations associated with the respective ones of the other repositories or the other repositories.

15. The method of claim 13, further comprising:
responsive to an absence of the plurality of existing recovery times, identifying a test recovery configuration that will establish a projected recovery time for the data asset of the request;
determining if there is at least one existing repository that has similar characteristics to the repository in the request;
responsive to an existence of the at least one existing repository, generating test recovery times by using the test recovery configuration, the at least one existing repository, and a pre-defined data workload asset with characteristics of the data asset of the request; and
projecting the recovery time for the data asset using the test recovery times.

16. The method of claim 15, wherein projecting the recovery time using the test recovery times further comprises:
projecting the recovery time for the data asset using the one or more test recovery times and one or more recovery rate input factors, wherein the one or more recovery rate input factors are recovery time characteristics of the test recovery configuration and the at least one existing repository.

17. The method of claim 16, wherein projecting the recovery time using the test recovery times further comprises:
projecting the recovery time for the data asset using the test recovery times and one or more recovery rate input factors, wherein the one or more recovery rate input factors are recovery time characteristics of the test recovery configuration and the simulated repository.

18. The method of claim 15, further comprising:
responsive to an absence of the existing repository, generating a simulated repository that has similar characteristics to the repository in the request;
generating the test recovery times by using the test recovery configuration, the simulated repository, and the pre-defined data workload asset with characteristics of the data asset of the request; and
projecting the recovery time for the data asset using the test recovery times.

* * * * *